US011506325B2

(12) United States Patent
Aamodt et al.

(10) Patent No.: US 11,506,325 B2
(45) Date of Patent: Nov. 22, 2022

(54) DEVICE FOR OPERATION ON A PRESSURIZED BOLT CONNECTION BETWEEN A FIRST FLANGED TUBULAR AND A SECOND FLANGED TUBULAR

(71) Applicant: IK-NORWAY AS, Stavanger (NO)

(72) Inventors: Kjetil Aamodt, Lye (NO); Oddvar Harboe-Wiig, Bryne (NO)

(73) Assignee: IK-NORWAY AS, Stavanger (NO)

( * ) Notice: Subject to any disclaimer, the term of this patent is extended or adjusted under 35 U.S.C. 154(b) by 477 days.

(21) Appl. No.: 16/617,701

(22) PCT Filed: May 30, 2018

(86) PCT No.: PCT/NO2018/050142
§ 371 (c)(1),
(2) Date: Nov. 27, 2019

(87) PCT Pub. No.: WO2018/222051
PCT Pub. Date: Dec. 6, 2018

(65) Prior Publication Data
US 2020/0103066 A1    Apr. 2, 2020

(30) Foreign Application Priority Data

Jun. 2, 2017 (NO) .................................. 20170915

(51) Int. Cl.
*F16L 55/18* (2006.01)
*F16L 23/00* (2006.01)
*F16L 23/036* (2006.01)

(52) U.S. Cl.
CPC .............. *F16L 55/18* (2013.01); *F16L 23/003* (2013.01)

(58) Field of Classification Search
CPC ....... F16L 23/003; F16L 23/02; F16L 23/036; F16L 55/18
See application file for complete search history.

(56) References Cited

U.S. PATENT DOCUMENTS

| 2002/0021004 A1* | 2/2002 | Mitchell | F16L 55/18 |
| | | | 285/15 |
| 2013/0221666 A1* | 8/2013 | Stephen | B23P 19/00 |
| | | | 285/410 |

(Continued)

FOREIGN PATENT DOCUMENTS

| CN | 104097182 | 10/2014 |
| EP | 0579878 | 1/1994 |

(Continued)

OTHER PUBLICATIONS

Norwegian Search Report for NO 20170915, dated Dec. 20, 2017.
International Search Report and the Written Opinion for PCT/NO2018/050142, dated Jul. 26, 2018.

*Primary Examiner* — Benjamin F Fiorello
*Assistant Examiner* — Stacy N Lawson
(74) *Attorney, Agent, or Firm* — Andrus Intellectual Property Law, LLP

(57) ABSTRACT

A device is for operation on a pressurized bolt connection between a first flanged tubular and a second flanged tubular. The device has a first clamping member with a first contact portion adapted to bear against the flange of the first tubular, a second clamping member with a second contact portion adapted to bear against the flange of the second tubular, and a connection arrangement for pulling the first clamping member and second clamping member together. The first contact portion and the second contact portion are adapted to bear at an inner part of the flanges between the bolts of the bolt connection and the body of the two tubulars.

15 Claims, 5 Drawing Sheets

(56) References Cited

U.S. PATENT DOCUMENTS

2016/0131288 A1\* 5/2016 Fontenot ............... F16L 23/003
                                                            285/411
2017/0051855 A1\* 2/2017 Munetomo ........... F16L 23/036

FOREIGN PATENT DOCUMENTS

| GB | 585296 A | \* | 2/1945 |
| JP | 2004316767 | | 11/2004 |
| JP | 2015108402 A | \* | 6/2015 |
| JP | 2015137683 | | 7/2015 |
| JP | 2016056830 | | 4/2016 |
| WO | 2006106333 | | 10/2006 |

\* cited by examiner

DEVICE FOR OPERATION ON A PRESSURIZED BOLT CONNECTION BETWEEN A FIRST FLANGED TUBULAR AND A SECOND FLANGED TUBULAR

CROSS-REFERENCE TO RELATED APPLICATIONS

This application is the U.S. national stage application of International Application PCT/NO2018/050142, filed May 30, 2018, which international application was published on Dec. 6, 2018, as International Publication WO 2018/222051 in the English language. The International Application claims priority of Norwegian Patent Application No. 20170915, filed Jun. 2, 2017. The international application and Norwegian application are both incorporated herein by reference, in entirety.

INTRODUCTION

The present invention relates to a device for operation on a pressurized bolt connection between a first flanged tubular and a second flanged tubular. The device comprises a first clamping member and a second clamping member. The first clamping member comprising a first body with a first contact portion adapted to bear against the flange of the first tubular. The second clamping member comprising a second body with a second contact portion adapted to bear against the flange of the second tubular. The device further comprises a connection arrangement for pulling the first clamping member and second clamping member together with a force that is transferred to the flanges of the first tubular and second tubular.

The present invention further relates to a method for operation on a pressurized bolt connection by means of the device of the invention and use of the device of the invention.

PRIOR ART

Pipe installations for conducting a medium, such as pipelines and etcetera, are generally constructed from a plurality of flanged tubulars that are connected by means of a bolt connection comprising a plurality of bolts in the flanges of the tubulars. Such pipe installations are used in a wide variety of processing industries, operation of hydrocarbon wells, etcetera, and are often in use under pressurized condition for a long duration of operation. After a period of time, the bolts may start corroding, in particular in case the pipe installation is located in a corrosive environment. Also a leakage of the medium at the bolt connection or adjacent to the bolt connection may enhance to the corrosion of the bolts.

It is often desired to replace the bolts of the bolt connection without depressurizing the pipe installations. Alternatively, it is desired to postpone the replacement work of the bolt connection while assuring the integrity of the bolt connection during the continued operation of the pipe installation. In order to achieve this, a so called hot bolting operation is performed, in which a clamp is positioned at the flanges of the bolt connection and acts to maintain sufficient compression of the flanges of the two tubulars, thereby securing the connection and allowing the bolts of the bolt connection to be replaced.

A problem with prior art hot bolting operation, is that the clamp increases the force in which the flanges are connected, and accordingly, the force subjected to a gasket between the flanges is increased, which may result in that the gasket becomes permanently damaged. A further problem with prior art hot bolting clamps is that when the flanges are further compressed, a moment is subjected to the gasket resulting in an uneven load on the gasket, and in particular, the edges of the gasket may be compressed to permanent damage. The uneven load may also reorient the gasket to a slanted state between the flanges that may result in a leakage of the medium that is conducted by the tubulars.

SUMMARY OF THE INVENTION

The invention has for its object to remedy or to reduce at least one of the drawbacks of the prior art, or at least provide a useful alternative to prior art. The object is achieved through features, which are specified in the description below and in the claims that follow. In particular, an object of the invention is to provide a device for operation on a pressurized bolt connection between a first flanged tubular and a second flanged tubular, which reduces the problem of damage on a gasket between the flanges.

This object is provided by means of a device comprising
  a first clamping member comprising a first body with a
    first contact portion adapted to bear against the flange
    of the first tubular,
  a second clamping member comprising a second body
    with a second contact portion adapted to bear against
    the flange of the second tubular, and
  a connection arrangement for pulling the first clamping
    member and second clamping member together with a
    force that is transferred to the flanges of the first tubular
    and second tubular.

The device is characterized in that the bolt connection comprises a plurality of bolts arranged in the flanges between the first tubular and the second tubular at a distance from the body of the tubular, wherein the first contact portion and the second contact portion are adapted to bear at an inner part of the flanges between the bolts and the body of the first tubular and the second tubular.

The first clamping member and second clamping member are pulled towards each other while acting on the flanges of the respective first and second tubular. By means of configuring the two clamping members so that the first contact portion and the second contact portion bear at the inner part of the respective flange between the bolts and the body of the tubular, the moment subjected by the device to the gasket between the two flanges is eliminated or reduced.

Accordingly, the device has the advantage of reducing the risk of damage to the gasket when replacing bolts of a pressurized bolt connection between the two tubulars or when adding the device for the purpose of securing the continued operation of the bolt connection between the two tubulars.

According to an embodiment of the invention, the first contact portion and the second contact portion are configured so that a main portion of the force from the connection arrangement is transferred through said inner part of the flanges, preferably more than 80% of the force from the connection arrangement is transferred through said inner part of the flanges, more preferable all or substantially all of the force from the connection arrangement is transferred through said inner part of the flanges. In order to reduce the moment subject to the gasket between the flanges, as much of the force as possible is directed through the inner part of the flanges, and when possible due to configuration of the flanges and bolt connection, all of the force is directed through the inner part of the flanges.

According to an embodiment of the invention, the respective first contact portion and second contact portion extend along a main portion of circumference at the inner part of the respective flange, preferably the full circumference at the inner part of the respective flange. In order to reduce the moment subject to the gasket between the flanges, it is preferable to have the first contact portion and the second contact portion extending along as much of the circumference at the inner part of the flanges, and when possible due to configuration of the flanges and bolt connection, extending along the full circumference at the inner part of the respective flange.

According to an embodiment of the invention, the flanges of the first tubular and the second tubular comprises a raised face on which a gasket is positioned, wherein a main portion of the force from the connection arrangement is transferred at a position in line with said raised face, preferably more than 80% of the force from the connection arrangement is transferred at a position in line with said raised face, more preferable all or substantially all of the force from the connection arrangement is transferred at a position in line with said raised face. Flanges are configured with raised faces in order to provide a defined position for the gasket between the flanges. By means of configuring the device so that the first contact portion and the second contact portion directs the force in line with the raised faces, the moment subject to the gasket between the flanges at the raised surfaces is eliminated or reduced.

According to an embodiment of the invention, the flanges of the first tubular and the second tubular typically comprises one of raised face, a flat face or a ring joint on which a gasket is positioned, wherein a main portion of the force from the connection arrangement is transferred at a position in line with said gasket, preferably more than 80% of the force from the connection arrangement is transferred at a position in line with said gasket, more preferable all or substantially all of the force from the connection arrangement is transferred at a position in line with said gasket. According to an embodiment of the invention, the respective first contact portion and second contact portion extend along a main portion of circumference in line with said raised face, preferably the full circumference at the inner part of the respective flange in line with said raised face.

According to an embodiment of the invention, the first body and second body comprising a respective flanged part adapted to extend away from the body of the first tubular and second tubular, and which respective flanged part comprises attachment means for the connection arrangement and a contact lip comprising the respective first contact portion and second contact portion arranged protruding from the flanged part towards the flange of the first tubular and second tubular.

According to an embodiment of the invention, each of the first clamping member and the second clamping member are arranged in at least two separate parts, and wherein the device comprises a further connection arrangement for holding the separate parts of the first clamping member and the second clamping member together. The two claiming members are arranged in two or more separate parts for positioning at the respective flanges.

According to an embodiment of the invention, the further connection arrangement comprises overlapping parts between the respective parts of the first body and the second body, and attachment means for holding the overlapping parts together. By configuring the two or more parts of the first body and the second body so that they overlap each other, a compact design of the device is obtained and the number of parts of the device involved in the connection to the flanges is kept to a minimum.

According to an embodiment of the invention, the further connection arrangement comprises a connection member configured to be arranged so that it overlaps the respective parts of the first body and the second body, and attachment means for attaching the connection member to respective parts of the first body and the second body. By means of using a separate connection member, the connection may be easier when the space available at the flanges is restricted, such as due to a connected valve assembly.

According to an embodiment of the invention, the connection member comprises two or more disc shaped elements adapted to overlap a corresponding intersection between the two or more parts of the respective first body and second body. By means of arranging connection member as disc shaped elements, the device is arranged compact and can be installed at bolt connection where the available space at the flanges is restricted.

According to an embodiment of the invention, the connection arrangement comprises further bolts and the further connection arrangement is arranged on the further bolts of the connection arrangement. By means of employing the further bolts of the connection arrangement for both pulling the two clamping members together and for holding separate parts of the first body and second body together, a compact design of the device is obtained and the number of parts of the device involved is kept to a minimum.

According to an embodiment of the invention, at least one of the first body and the second body is configured with opening for enabling access to the bolts of the bolt connection. By means of the openings, it is possible to release the set of bolts of the bolt connection and replace the bolts with a new set of bolts.

The object of the invention is further obtained by means of a method for operation on a pressurized bolt connection between a first flanged tubular and a second flanged tubular by means of a device according to any of above embodiment of the invention. The method comprises the step of:
  positioning the first clamping member on the flange of the first tubular so that the first contact portion bears against an inner part of the flange between the bolts and the body of the first tubular,
  positioning the second clamping member on the flange of the second tubular so that the second contact portion bears against an inner part of the flange between the bolts and the body of the second tubular, and
  connecting the first clamping member and the second clamping member together by means of the connection arrangement so that the first clamping member and the second clamping member are pulled towards each other with a force that is transferred to the flanges of the first tubular and second tubular.

According to an embodiment of the invention, the method further comprises:
  replacing bolt of the bolts connection with new set of bolts,
  disconnecting the connection arrangement, and
  removing the first clamping member and the second clamping member from the respective flange of the first tubular and second tubular.

The object of the invention is further obtained by means of use of device according to any of above embodiments of the invention.

BRIEF DESCRIPTION OF DRAWINGS

In the following is described examples of preferred embodiments illustrated in the accompanying drawings, wherein.

DETAILED DESCRIPTION

Figure 1:
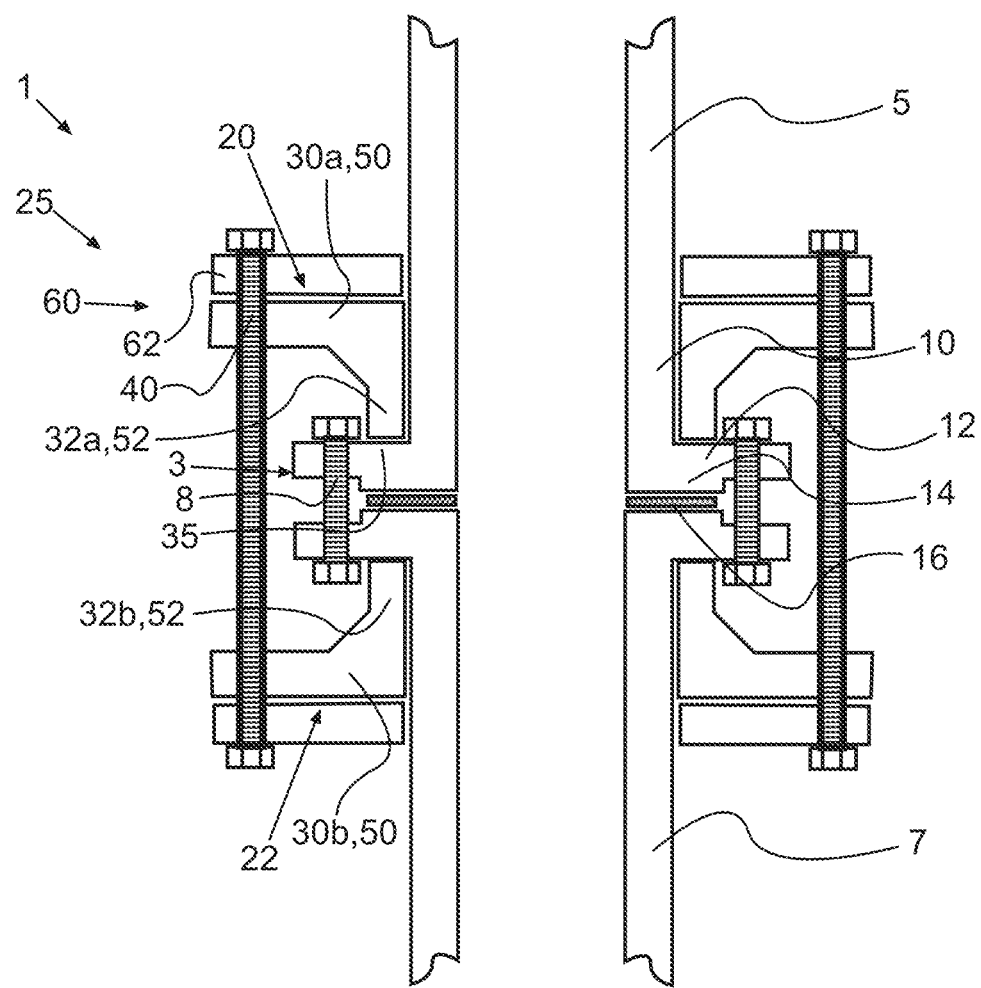
FIG. 1 discloses a schematic view of a cross section of a device for operation on a pressurized bolt connection between a first flanged tubular and a second flanged tubular according to an embodiment of the invention.

In FIG. 1 a schematic view of a cross section of a device 1 for operation on a pressurized bolt connection 3 between a first flanged tubular 5 and a second flanged tubular 7 is disclosed. The bolt connection 3 comprises a plurality of bolts 8 arranged between the flange of the first tubular 5 and the flange of the second tubular 7. The first tubular 5 and the second tubular 7 comprise a respective body 10 and a flange 12.

In FIG. 1, the flange 12 of the first tubular 5 and the second tubular 7 comprise a respective raised face 14 on which a gasket 16 is arranged. The raised face 14 is in the form a plateau that provides a defined position for the gasket 16.

The device 1 comprises a first clamping member 20, a second clamping member 22 and a connection arrangement 25 for pulling the first clamping member 20 and second clamping member 22 together with a force that is transferred to the flanges 12 of the first tubular 5 and the second tubular 7.

The first clamping member 20 comprising a first body 30a with a first contact portion 32a adapted to bear against the flange 12 of the first tubular 5 at an inner part 35 of the flange 12 between the bolts 8 of the bolt connection 3 and the body 10 of the first tubular 5.

Correspondingly, the second clamping member 22 comprising a second body 30b with a second contact portion 32b adapted to bear against the flange 12 of the second tubular 7 at an inner part 35 of the flange 12 between the bolts 8 of the bolt connection 3 and the body 10 of the second tubular 7. The first body 30a and the second body 30b are configured with opening for enabling access to the bolts 8 of the bolt connection 3.

The connection arrangement 25 comprises further bolts 40 that connects the first clamping member 20 and the second clamping member 22 so that they act with a force that is transmitted to the flanges 12 of the first tubular 5 and second tubular 7.

In the disclosed embodiment of the invention, all of the force transmitted to the flanges 12 of the first tubular 5 and the second tubular 7 is transferred at the inner part 35. In particular, in the disclosed embodiment, the force is transferred at a position in line with the raised face 14 of the flanges 12 of the first tubular 5 and second tubular 7.

The first body 30a comprises a flanged part 50 and a contact lip 52 comprising the first contact portion 32a.

Correspondingly, the second body 30b comprises a flanged part 50 and a contact lip 52 comprising the second contact portion 32b.

The first clamping member 20 is arranged in at least two separate parts for the purpose of positioning the first clamping member 20 at the flange 12 of the first tubular 5. The device 1 also comprises a further connection arrangement 60 for holding the separate parts of the first clamping member 20 together. The further connection arrangement 60 comprises a connection member 62 configured to be arranged so that it overlaps the respective parts of the first body 30a, and attachment means for attaching the connection member 62 to respective parts of the first body 30a.

In the disclosed embodiment, the connection member 62 comprises a disc shaped element in two or more separate parts. The disc shaped element is adapted to be attached so that it overlaps intersections between the two or more parts of the first body 30a. In the disclosed embodiment, the connection member 62 comprises openings for receiving bolts 40 of the connection arrangement 25. The further connection arrangement 60 is arranged correspondingly for the second body 30b of is the second clamping member 22.

Figure 3A:
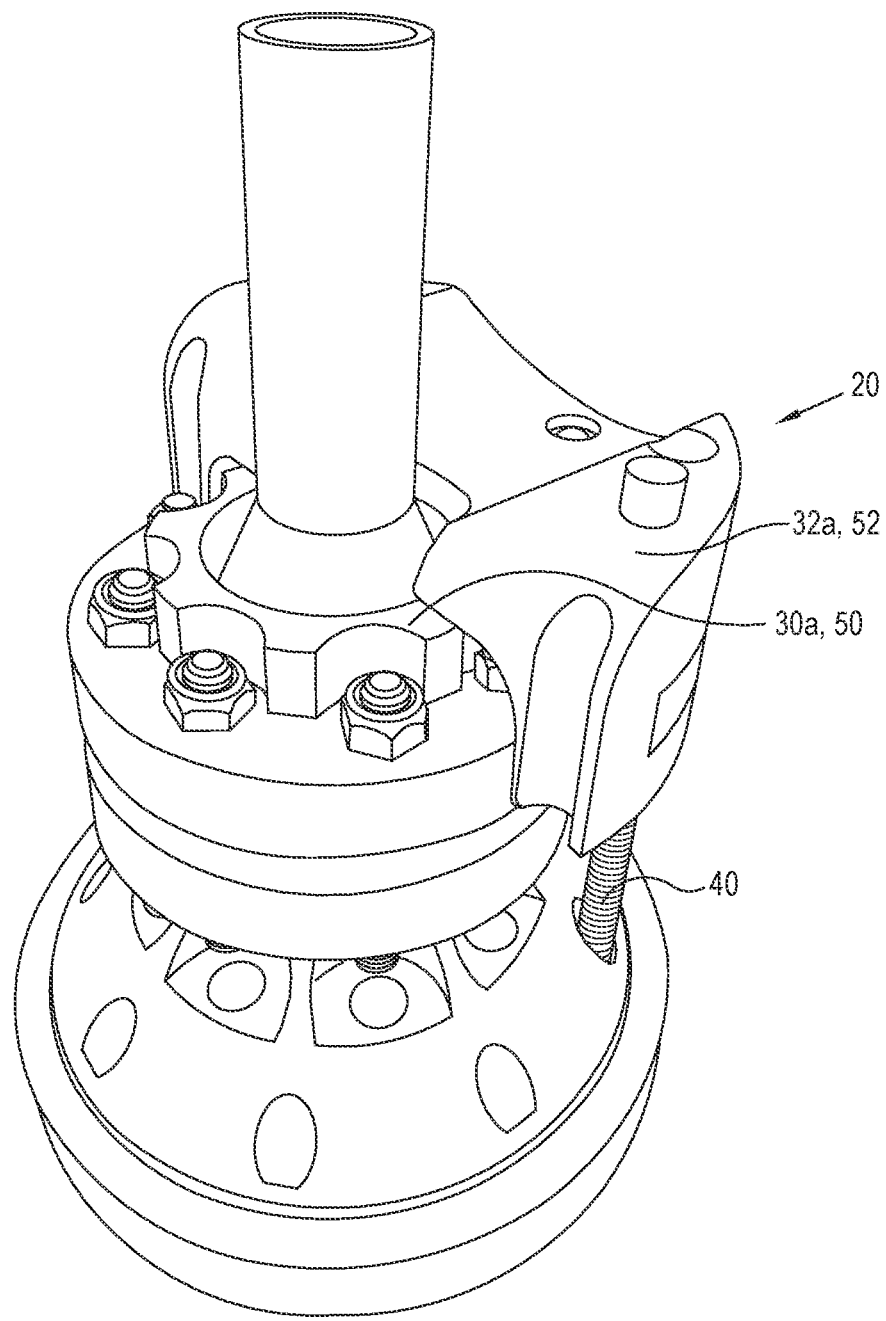
FIG. 3a discloses a side view of one part of a first clamping member of a device according to a further embodiment of the invention.
Figure 3B:
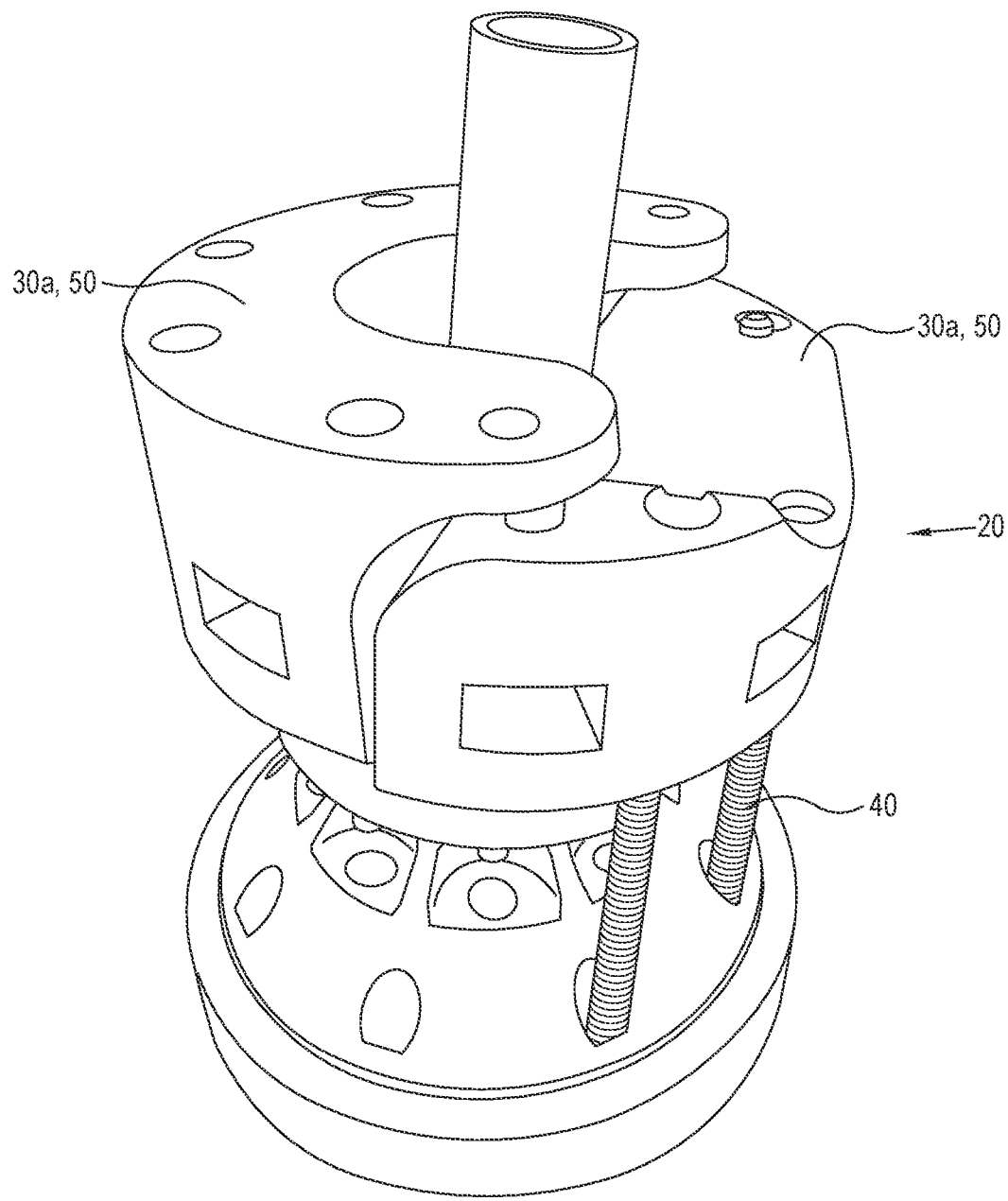
FIG. 3b discloses a side view of two parts of the first clamping member in FIG. 3a arranged connected at a flange of a first tubular.

In an embodiment of the invention, the further connection arrangement 60 comprises overlapping parts between the two or more parts of the first body 30a, and attachment means for holding the overlapping parts together, see FIG. 3a, 3b. The further connection arrangement 60 is correspondingly arranged for the second body 30b of the second clamping member 22.

Figure 2A:
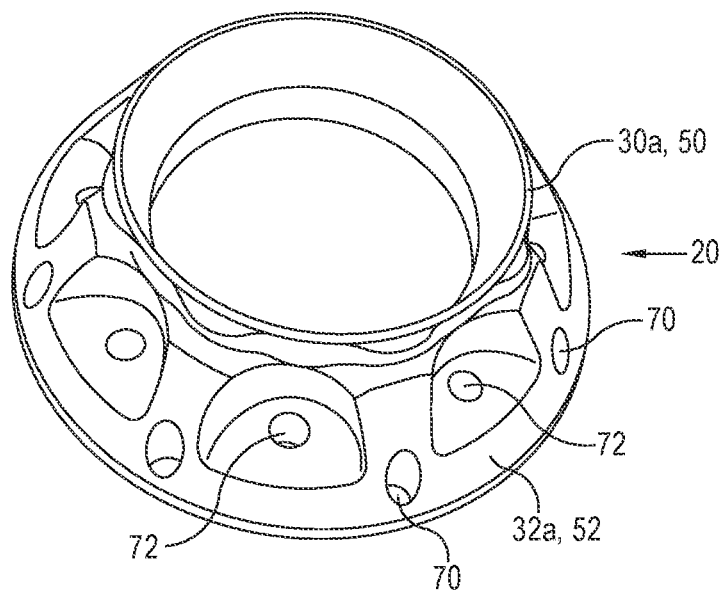
FIG. 2a discloses a side view of a first clamping member of a device according to a further embodiment of the invention.
Figure 2B:
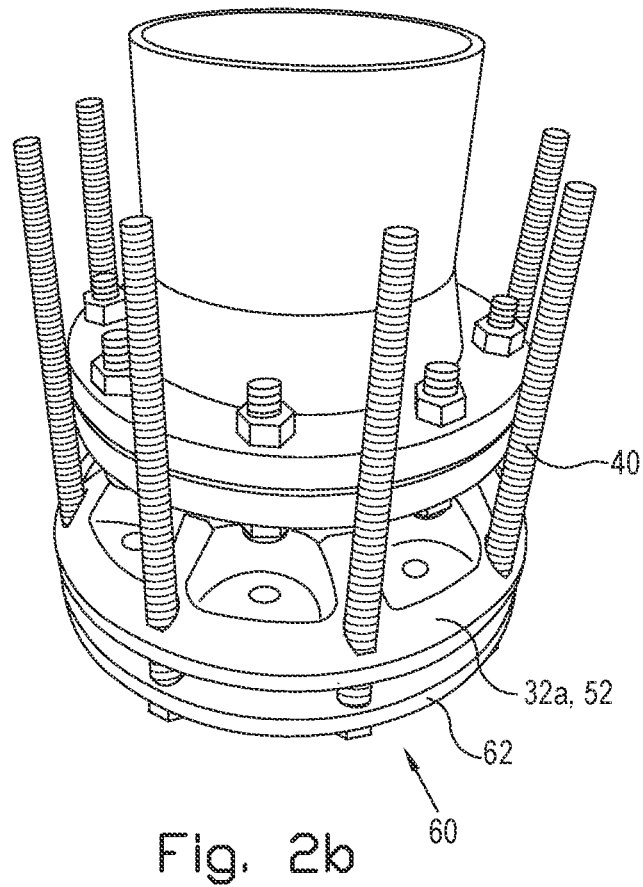
FIG. 2b discloses a side view of the first clamping member in FIG. 2a arranged at a flange of a first tubular.

In FIG. 2a, 2b, a further embodiment of the device 1 of the invention is disclosed. In FIG. 2a a side view of an example of the first clamping member 20 is disclosed. The first body 30a of first clamping member 20 is disclosed as a single unit, however, it shall be understood that the first body 30a would comprising an intersection or be arranged in two or more separated parts for enable positioning the first clamping member 20 on the flange of the first tubular 5.

The first contact portion 32a is arranged with a circular form adapted to bear along the full circumference at the inner part 35 of the flange 12 of the first tubular 5.

The first body 30a comprises first openings 70 for receiving further bolts 40 of the connection arrangement 25 for pulling the first clamping member 20 and second clamping member 22 together with a force. Furthermore, the first body 30a comprises second openings 72 for allowing the bolt 8 to extend into the first body 30a above its nut. The first openings 70 and second openings 72 are arranged in the flanged part 50 of the first body 30a.

The contact lip 52 on which the first contact portion 32a is positioned, extends away from the flanged part 50. The first body 30a is configured with openings for enabling access to the bolts 8 of the bolt connection 3. In the disclosed embodiment, the access to the bolts 8 of the bolt connection 3 is arranged in parallel to the flanged part 50.

In FIG. 2b, a side view of the first clamping member 20 in FIG. 2a is disclosed. The device 1 comprises the further connection arrangement 60 comprising the connection member 62 that is configured to be arranged so that it overlaps the two or more separate parts of the first body 30a. In the disclosed embodiment, the connection member 62 comprises two or more disc shaped elements adapted to overlap a corresponding intersection between the two or more parts of the first body 30a. The two or more disc shaped elements are attached to the first body 30a by means of the bolts 40 of the of the connection arrangement 25.

In FIG. 3a is a side view of one part of a first clamping member 20 of a device 1 according to a further embodiment of the invention disclosed. The embodiment differs from the embodiment in FIGS. 2a and 2b in that further connection arrangement 60 comprises overlapping parts between the two or more parts of the first body 30a, see FIG. 3b. Accordingly, no separate connection member 62 is needed for connecting the two or more parts of the first body 30a together.

The embodiment further differs from the embodiment in FIGS. 2a and 2b in that the first contact portion 52 is arranged as a separate part from the flanged part 50 of the first body 30a. It shall be understood that the first contact portion 32a also is arranged with an intersection or in two or more separated parts for enable being positioned on the flange 12 of the first tubular 5. Alternatively, as in the embodiment in FIGS. 2a and 2b, the first contact portion 32a may be a part of the contact lip 52 connected to the flanged part 50 of the first body 30a.

Figure 4:
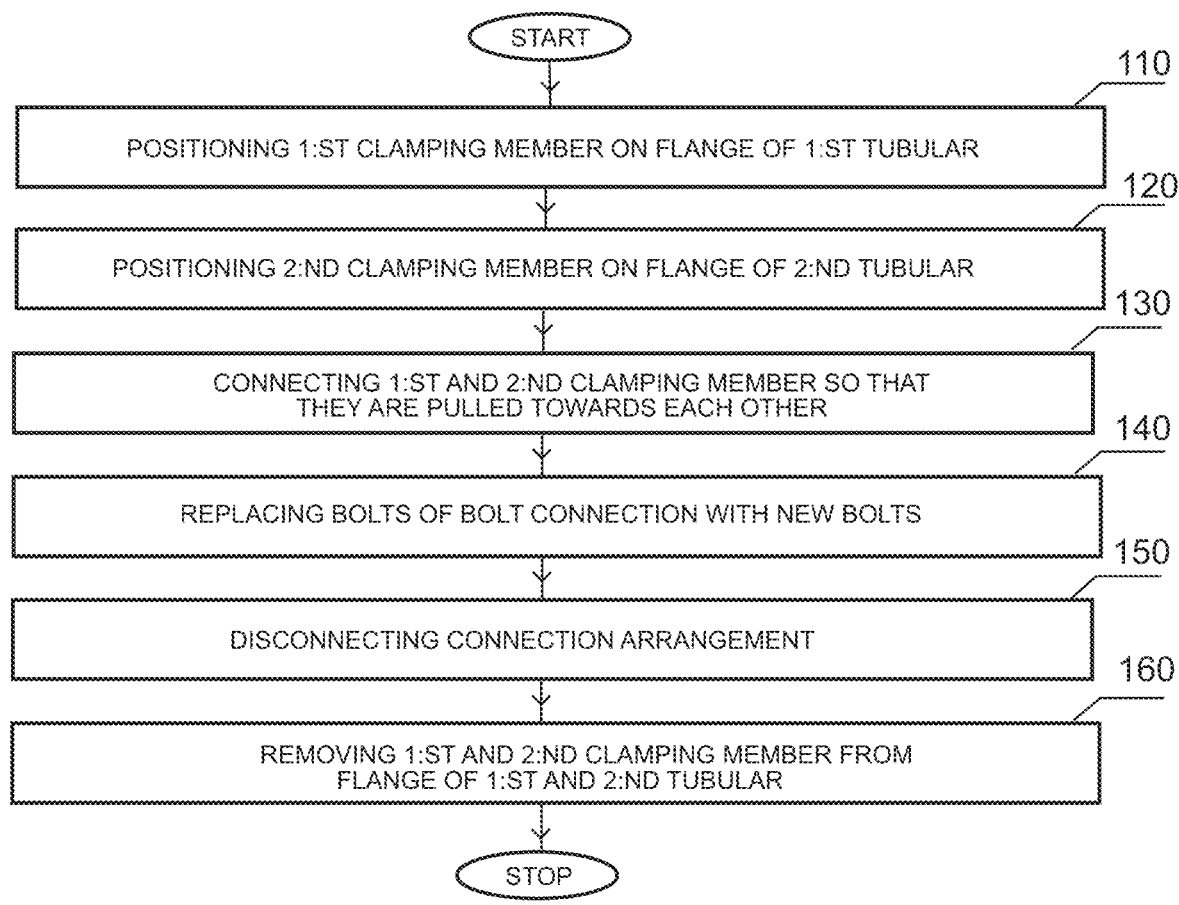
FIG. 4 discloses a flow chart of a method for operation on a pressurized bolt connection according to an embodiment of the invention.

In FIG. 4 a flow chart of a method for operation on a pressurized bolt connection 3 according to an embodiment of the invention is disclosed. By means of a device 1 of the invention, the method comprises, in a step 110, positioning the first clamping member 20 on the flange 12 on the first tubular 5 so that the first contact portion 32a bears against an inner part 35 of the flange 12 between the bolts 8 and the body 10 of the first tubular 5. The method comprises, in a step 120, positioning the second clamping member 22 on the flange 12 of the second tubular 7 so that the first contact portion 32b bears against an inner part 35 of the flange 12 between the bolts 8 and the body 10 of the second tubular 7.

The method comprises, in a step 130, connecting the first clamping member 20 and the second clamping member 22 together by means of the connection arrangement 25 so that the first clamping member 20 and the second clamping member 22 are pulled towards each other with a force. Thereby, the flanges 12 of the first tubular 5 and second tubular 7 are pulled together so to enable the bolts 8 of the bolt connection 3 to be replaced. Alternatively, the device 1 is merely used to further secure the bolted connection 3 for further use of the tubulars 5, 7.

The method comprises, in a step 140, replacing bolt 8 of the bolts connection 3 with new set of bolts. Thereafter, the method is terminated by means of, in a step 150, disconnecting the connection arrangement 25, and in a step 160, removing the first clamping member 20 and the second clamping 22 from the respective flange 12 of the first tubular 5 and second tubular 7.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A device for operation on a pressurized bolt connection between a first flanged tubular and a second flanged tubular, the device comprising:
a first clamping member comprising a first body with a first contact portion adapted to bear against the flange of the first tubular,
a second clamping member comprising a second body with a second contact portion adapted to bear against the flange of the second tubular, and
a connection arrangement for pulling the first clamping member and second clamping member together with a force that is transferred to the flanges of the first tubular and second tubular,
wherein the bolt connection comprises a plurality of bolts extending between the first tubular and the second tubular and arranged in the flanges at a distance from a body of the respective tubular, wherein the first contact portion and the second contact portion are adapted to bear at an inner part of the flanges between the bolts and the respective body of the first tubular and the second tubular;
wherein each of the first clamping member and the second clamping member are arranged in at least two separate parts;
wherein the connection arrangement comprises a connection member configured to be arranged so that it overlaps the respective parts of the first body and the second body, and further comprises attachment means for attaching the connection member to respective parts of the first body and the second body; and
wherein the connection member comprises two or more disc shaped elements adapted to overlap a corresponding intersection between the two or more parts of the respective first body and second body.

2. The device according to claim 1, wherein the first contact portion and the second contact portion are configured so that a main portion of the force from the connection arrangement is transferred through said inner part of the flanges.

3. The device according to claim 2, wherein more than 80% of the force from the connection arrangement is transferred through said inner part of the flanges.

4. The device according to claim 2, wherein all or substantially all of the force from the connection arrangement is transferred through said inner part of the flanges.

5. The device according to claim 1, wherein the respective first contact portion and second contact portion extend along a main portion of a circumference of the inner part of the respective flange.

6. The device according to claim 1, wherein the flanges of the first tubular and the second tubular comprise a raised face on which a gasket is positioned, wherein a main portion of the force from the connection arrangement is transferred at a position in line with said raised face.

7. The device according to claim 6, wherein the respective first contact portion and second contact portion extend along a main portion of a circumference of the inner part of the respective flange in line with said raised face.

8. The device according to claim 6, wherein more than 80% of the force from the connection arrangement is transferred at a position in line with said raised face.

9. The device according to claim 6, wherein all or substantially all of the force from the connection arrangement is transferred at a position in line with said raised face.

10. The device according to claim 1, wherein the first body and second body comprise a respective flanged part adapted to extend away from the body of the first tubular and second tubular, and which respective flanged part comprises the attachment means, and a contact lip comprising the respective first contact portion and second contact portion arranged protruding from the flanged part towards the flange of the first tubular and second tubular.

11. The device according to claim 1, wherein the connection arrangement comprises overlapping parts between the respective parts of the first body and the second body, and the attachment means for holding the overlapping parts together.

12. The device according to claim 1, wherein the attachment means comprises further bolts arranged on the connection member.

13. The device according to claim 1, wherein at least one of the first body and the second body is configured to open for enabling access to the bolts of the bolt connection.

14. A method for operation on a pressurized bolt connection between a first flanged tubular and a second flanged tubular with a device comprising:
   a first clamping member comprising a first body with a first contact portion adapted to bear against the flange of the first tubular,
   a second clamping member comprising a second body with a second contact portion adapted to bear against the flange of the second tubular, and
   a connection arrangement for pulling the first clamping member and second clamping member together with a force that is transferred to the flanges of the first tubular and second tubular,
wherein the bolt connection comprises a plurality of bolts extending between the first tubular and the second tubular and arranged in the flanges at a distance from a body of the respective tubular, wherein the first contact portion and the second contact portion are adapted to bear at an inner part of the flanges between the bolts and the respective body of the first tubular and the second tubular;
wherein each of the first clamping member and the second clamping member are arranged in at least two separate parts;
wherein the connection arrangement comprises a connection member configured to be arranged so that it overlaps the respective parts of the first body and the second body, and further comprises attachment means for attaching the connection member to respective parts of the first body and the second body; and
wherein the connection member comprises two or more disc shaped elements adapted to overlap a corresponding intersection between the two or more parts of the respective first body and second body;
wherein the method comprises the steps of:
   positioning the first clamping member on the flange of the first tubular so that the first contact portion bears against the inner part of the flange between the bolts and the body of the first tubular,
   positioning the second clamping member on the flange of the second tubular so that the second contact portion bears against the inner part of the flange between the bolts and the body of the second tubular, and
   connecting the first clamping member and the second clamping member together via the connection arrangement so that the first clamping member and the second clamping member are pulled towards each other with a force that is transferred to the flanges of the first tubular and second tubular.

15. The method according to claim 14, wherein the method further comprises:
   replacing the plurality of bolts of the bolt connection with a new set of bolts,
   disconnecting the connection arrangement, and
   removing the first clamping member and the second clamping member from the respective flange of the first tubular and second tubular.

\* \* \* \* \*